United States Patent [19]
Gehlert et al.

[11] 3,711,195
[45] Jan. 16, 1973

[54] SLIDE PROJECTOR WITH AUTOMATIC MAGAZINE RESETTING MEANS

[75] Inventors: Rolf Gehlert; Ulrich Schmidt, both of Munich, Germany

[73] Assignee: Agfa-Gevaert Aktiengesellschaft, Leverkusen, Germany

[22] Filed: Oct. 29, 1970

[21] Appl. No.: 85,148

[30] Foreign Application Priority Data

Oct. 31, 1969 Germany.....................P 19 54 792.3

[52] U.S. Cl.....................................353/116, 40/79
[51] Int. Cl.............................................G03b 23/04
[58] Field of Search.............................353/103–116; 40/36, 78, 79

[56] References Cited

UNITED STATES PATENTS 3,464,767  9/1969  Mulch......................................40/79
3,067,535  12/1962  Mulch......................................40/79
3,033,078  5/1962  Robinson..............................353/116

Primary Examiner—Leonard Forman
Assistant Examiner—A. J. Mirabito
Attorney—Michael S. Striker

[57] ABSTRACT

A slide projector wherein the magazine is automatically reset to a starting position in which the foremost slide of a series of slides in the magazine is located in the range of the slide changer. Such resetting is carried out by a motor whose circuit is completed by a thyristor when a detector detects the placing of the last slide of the series into the range of the slide changer and when the slide changer thereupon actuates a first two-way switch which is actuated whenever a slide is returned to its compartment. The thyristor triggers the operation of the slide changer and of the indexing mechanism for the magazine in response to actuation of a second two-way switch which is actuated on return of the magazine to its starting position.

19 Claims, 3 Drawing Figures

SLIDE PROJECTOR WITH AUTOMATIC MAGAZINE RESETTING MEANS

BACKGROUND OF THE INVENTION

The present invention relates to projectors for photographic transparencies, hereinafter called slides, and more particularly to improvements in slide projectors which are provided with resetting means to permit repeated viewing of a series of slides which are inserted into the compartments of a magazine or tray.

Presently known projectors for repeated viewing of a series of slides are provided with switches which are connected in the circuit of a reversible motor and are actuatable by projections which are mounted at the front and rear ends of the magazine. The projection at the rear end of the magazine causes the motor to transport the magazine rearwardly and the projection at the front end of the magazine reverses the motor when the magazine returns to a starting position in which the slide located in the foremost compartment of the magazine is ready to be transferred to a projection position. Thus, the projection at the rear end of the magazine can reverse the motor when the magazine is moved to its foremost position, irrespective of whether the magazine contains a single slide, a few slides or a maximum number of slides. Consequently, the intervals between repeated projections of images on the slides are longer when the magazine contains less than the maximum number of slides because the projection at the rear end of the magazine can reverse the motor only when the magazine reaches its foremost position, namely, that position in which the last or rearmost compartment of the magazine is in registry with the slide changer. Lengthy intervals between repeated projections of images on a relatively small number of slides are annoying and hence undesirable, especially if such repeated projections are to be made for the purpose of advertising.

It is also known to replace the aforementioned projections with plate-like switch-actuating devices which are inserted into a magazine in front of the foremost slide and behind the rearmost slide of a series. The thus inserted actuating devices perform the same function as the aforementioned projections and enable the operator to insure that the length of intervals between the projection of the image on the last slide of a series and renewed projection of the image on the foremost slide is always the same. A drawback of such projectors is that the actuating devices must be inserted and removed by hand whenever the operator wishes to repeat the projection of images on a series of slides and also that a removable actuating device is likely to become lost or misplaced.

SUMMARY OF THE INVENTION

An object of the invention is to provide a slide projector wherein the projection of images on a longer or shorter series of slides can be automatically repeated as often as desired, wherein the length of intervals between the projection of the image on the last slide and the projection of the image on the foremost slide of a series of slides in a magazine or tray is always the same irrespective of the number of slides which form the series (i.e., independently of the extent to which the magazine is filled with slides), and wherein such advantageous mode of operation can be achieved without resorting to actuating devices or other discrete parts which must be inserted into or withdrawn from the magazine.

Another object of the invention is to provide a slide projector with novel resetting means for the magazine and with novel control means which regulates the operation of the resetting means in dependency on the number of slides in the magazine and which can also control the operation of the drive which indexes the magazine in a forward direction and transmits motion to a slide changer which transports a slide between the respective compartment of the magazine and a projection position during each interval between successive indexing movements of the magazine.

A further object of the invention is to provide a slide projector with novel and improved means for scanning the slides in the magazine and for co-operating with the aforementioned control means to effect timely changes in the direction of movement of the magazine.

The invention is embodied in a slide projector which comprises a preferably straight magazine or tray having a row of compartments for a shorter or longer series of slides and being movable forwardly from and rearwardly to a starting position, drive means including indexing means for indexing the magazine forwardly in stepwise fashion and slide changer means for moving the slides between successive compartments and a projection position during the intervals between successive indexing movements of the magazine, resetting means operative to move the magazine rearwardly to its starting position, control means having a first condition in which the resetting means is operated to move the magazine rearwardly and a second condition in which the drive means is operative to index the magazine and to move the slides with reference to the magazine, detector means arranged to scan the slides in the magazine, first switching means for placing the control means into the first condition subsequent to detection of the last slide of the series, and second switching means for placing the control means into the second condition in response to return of the magazine to its starting position.

The control means preferably comprises a thyristor or a transistor and the drive means preferably comprises an electric driving element, for example, an electromagnetic clutch, which can connect the indexing means and the slide changer means with a main motor in response to return of the magazine to its starting position. The resetting means preferably comprises an electric motor whose circuit is completed by the control means when the latter assumes its first condition. The first switching means may comprise a two-way switch which is actuated by the slide changer means and places the control means into its first condition when the last slide of a series is returned into its compartment. The aforementioned driving element can be connected with the control means by way of a suitable switching device, preferably an amplifier transistor.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
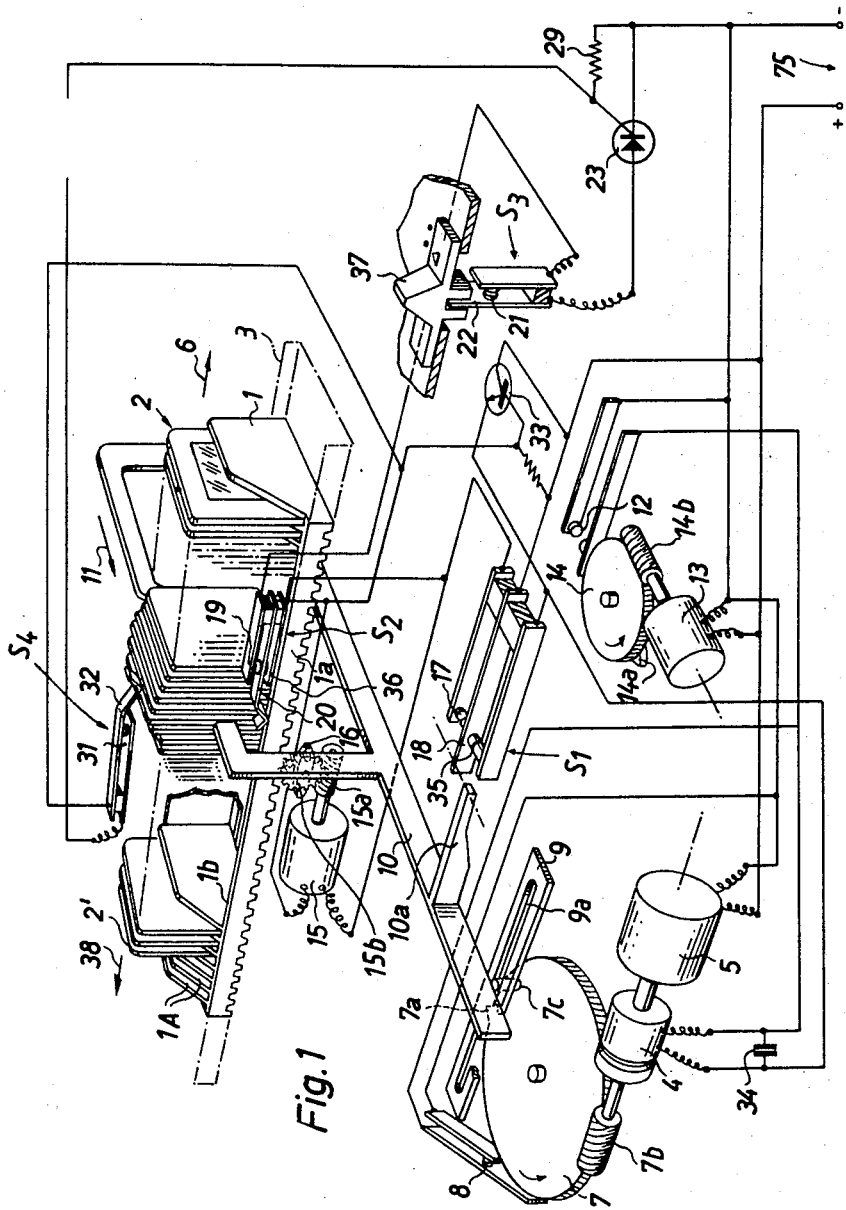
FIG. 1 is a fragmentary diagrammatic perspective view of a slide projector which embodies one form of the invention and wherein the detector means includes a switch one contact of which is in direct engagement with the slides.
Figure 2:
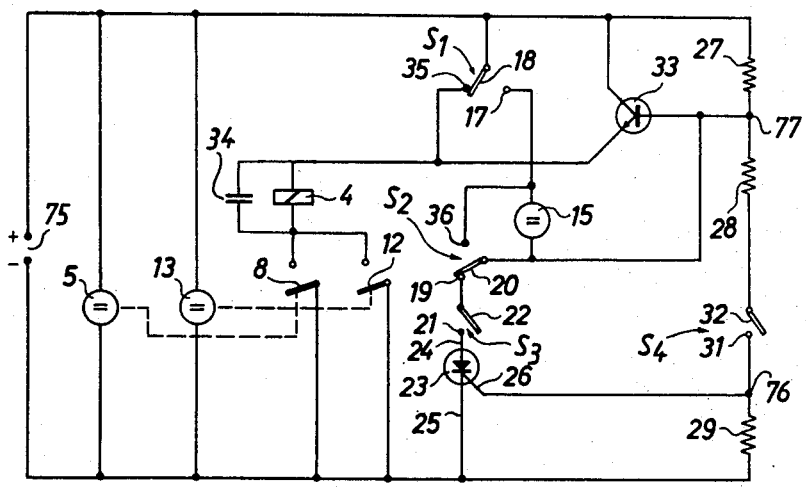
FIG. 2 illustrates the electric circuit of the projector shown in FIG. 1.

The mechanical and electrical details of the first slide projector are respectively shown in FIGS. 1 and 2. FIG. 1 illustrates a straight magazine or tray 1 for slides 2. The magazine may but need not be completely filled with slides and is reciprocable in a guide channel 3. This channel preferably forms part of the housing of the slide projector.

The drive means of the slide projector includes a mechanism for indexing the magazine 1 in a forward direction so as to place successive slides 2 into registry with a slide changer 10. The drive means further includes a main motor 5 which drives the indexing mechanism by way of a driving element here shown as an electromagnetic clutch 4. The direction in which the magazine 1 can be indexed by the main motor 5 and clutch 4 is indicated by the arrow 6. The electromagnet of the clutch 4 is connected in parallel with a capacitor 34.

The slide changer 10 is reciprocable by the main motor 5 through the intermediary of the clutch 4. The means for reciprocating the slide changer 10 when the clutch 4 is energized comprises a worm wheel 7 meshing with a worm 7b on the driven portion of the clutch 4 and having an eccentric pin 7c extending into an elongated slot 9a provided in a carriage 9 which is guided for reciprocatory movement diagonally of the worm wheel 7, i.e., lengthwise of the carriage 9 and is reciprocable in a plane at right angles to the direction of lengthwise movement of the magazine 1. The carriage 9 causes the slide changer 10 to move back and forth whereby the slide changer transfers a slide 2 from the respective compartment 1A of the magazine 1 while moving in the direction indicated by the arrow 11. Such slide is moved to a projection position in which it registers with the optical system (not shown) of the projector. The slide is transported back into the corresponding compartment 1A of the magazine 1 when the slide changer 10 is caused to move in the opposite direction.

The frequency of reciprocatory movements of the slide changer 10 and the length of periods during which a slide 2 dwells in the projection position are determined by a master switch 8 which is actuatable by a projection or trip 7a of the worm wheel 7 and a timer switch 12 which is actuatable by a projection or trip 14a provided on a worm wheel 14 driven by a worm 14b on the output shaft of a timer motor 13. The timer switch 12 is connected in parallel with the master switch 8.

The slide projector further comprises a third motor 15 which serves to reset the magazine 1 by moving it backwards (arrow 38) upon projection of the image of the last slide 2'. This slide may but need not be located in the last or rearmost compartment 1A of the magazine; as shown in FIG. 1, the slide 2' fills the fourth-to-the-last compartment 1A. The magazine 1 has a longitudinally extending toothed rack 1a meshing with a pinion having two teeth 16 located diametrically opposite each other. This pinion is rigid or integral with a worm wheel 15b meshing with a worm 15a on the output shaft of the motor 15. The motor 15 can be connected with the positive pole of an energy source 75 by way of the contacts 17, 18 of a first switching means here shown as a two-way switch S1 having contacts 17, 18, 35 and being actuatable by an arm or trip 10a of the slide changer 10. The motor 15 is connectable with the negative pole of the energy source 75 by the contacts 19, 20 forming part of a second switching means or two-way switch S2 which includes the contacts 19, 20, 36. The switch S2 is a limit switch. The connection between the negative pole of the energy source 75 and the resetting motor 15 further comprises a manually operable switch S3 having contacts 21, 22 and being actuatable by a handgrip portion 37. Still further, the connection between the motor 15 and the negative pole of the energy source 75 comprises the contact electrodes 24, 25 of a control element here shown as a thyristor 23. The control electrode 26 of the thyristor 23 is connected to a tap 76 between the elements of a voltage divider which includes a first resistor 29 and a second resistor including two series-connected resistors 27, 28. A detector switch S4 comprises contacts 31, 32 and is adjacent to the path of movement of the slides 2 in the magazine 1. In the embodiment of FIG. 1, the switch S4 is located at a level above the path of the slides 2 in such position that the contact 32 is deformed and held away from the contact 31 until the last slide 2' advances forwardly beyond the switch S4, i.e., into the range of the slide changer 10. When the switch S4 is permitted to close, the control electrode 26 of the thyristor 23 is connected with the resistors 27, 28 of the voltage divider.

A tap 77 between the resistors 27, 28 of the voltage divider is connected with the base of a switching device here shown as an npn amplifier transistor 33 which serves to energize the electromagnet of the clutch 4. The base of the transistor 33 can be connected with the contact electrode 24 of the thyristor 23 by way of the contacts 19, 20 (switch S2) and 21, 22 (switch S3). The collector of the transistor 33 is connected with the positive pole of the energy source 75 and the emitter of the transistor 33 is connected to the electromagnet of the clutch 4. The electromagnet of the clutch 4 can be connected with the positive pole of the energy source 75 by way of the contact 35 of the switch S1. The contact 36 of the switch S2 can shunt the motor 15.

The arm 10a of the slide changer 10 moves the median contact 18 of the switch S1 into engagement with the contact 17 when a slide 2 is returned from the projection position into the respective compartment 1A of the magazine 1. The contact 18 normally engages the contact 35. The median contact 20 of the switch S2 engages the smooth top face 1b of the rack 1a on the magazine 1 and is thereby held in engagement with the contact 19. The position of the contact 20 is selected in such a way that it does not as yet engage the face 1b of the rack 1a when the foremost slide 2 in the magazine 1 registers with the slide changer 10, namely, when the magazine assumes its starting position in which the foremost slide 2 is located in the range of the slide changer 10. The contact 20 then engages the contact 36. The handgrip portion 37 preferably includes or co-operates with a detent device which enables it to dwell in each of two positions in one of which the switch S3 including the contacts 21, 22 is open and in the other of which the switch S3 is closed. The rack 1a can form part of the aforementioned indexing mechanism for the magazine 1.

The operation:

The user inserts the magazine 1 into the channel 3 to such an extent that the foremost slide 2 is located in the plane of the slide changer 10. This is the starting position of the magazine. The contact 20 of the switch S2 is located in front or forwardly of the top face 1b of the rack 1a and thus engages the contact 36. In order to insure that the projector will automatically repeat the projection of images on the slides in the magazine 1, the user closes the switch S3 by means of the handgrip portion 37 so that the contact 22 is held in engagement with the contact 21. The contact 18 of the switch S2 engages the contact 35 so that the electromagnet of the clutch 4 can be energized in response to closing of the master switch 8 and/or timer switch 12. Therefore, the main motor 5 (which is on) can drive the indexing mechanism for the magazine 1 by way of the clutch 4 and the latter also drives the worm wheel 7 by way of the worm 7b. The worm wheel 7 reciprocates the slide changer 10 so that the latter moves a slide 2 to projection position and maintains the slide in such position for an interval of time whose length is determined by the timer unit including the motor 13 and switch 12. The slide 2 is thereupon returned into the respective compartment 1A. During such return movement, the arm 10a of the slide changer 10 moves the contact 18 of the switch S1 away from the contact 35 and into engagement with the contact 17. Such actuation of the switch S1 does not influence the resetting motor 15 as long as the detector switch S4 remains open, i.e., as long as a slide 2 holds the contact 32 against movement into engagement with the contact 31.

During the interval when the slide changer 10 changes the direction of its movement, the electromagnet of the clutch 4 receives current by way of the collector-emitter circuit of the transistor 33 whose base is positive. The magazine 1 is then indexed by a step so as to place the next slide 2 into register with the slide changer 10. The same procedure is repeated until the next-to-the-last slide 2 is returned into the corresponding compartment 1A of the magazine 1. The magazine 1 is thereupon indexed again so that the last slide 2' moves into the range of the slide changer 10. This enables the elastic contact 32 of the detector switch S4 to engage the fixed contact 31 so that the control electrode 26 of the thyristor 23 receives current whose voltage is determined by the resistances of the resistors 27-29 of the voltage divider. This voltage is selected in such a way that the thyristor 23 temporarily conducts current. The positive potential at the base of the transistor 33 decreases to the extent determined by the ratio of resistors 27-28 and 29 in the voltage divider whereby the transistor 33 blocks. The contact 18 of the switch S1 engages the contact 35 during transport of the last slide 2' from the magazine 1 to projection position, while the last slide 2' dwells in such projection position and while the last slide moves back toward the respective compartment 1A. Thus, the electromagnet of the clutch 4 is energized. As the last slide 2' returns into its compartment, the arm 10a of the slide changer 10 (in the latter's right-hand end position, as viewed in FIG. 1) moves the contact 18 away from the contact 35 and into engagement with the contact 17. Thus, the circuit of the resetting motor 15 is completed because the switch S3 is closed by the handgrip portion 37 and the contact 20 of the switch S2 continues to engage the contact 19. The thyristor 23 is conductive because the detector switch S4 is closed. Therefore, the resetting motor 15 drives the magazine 1 rearwardly by way of the worm 15a, worm wheel 15b, pinion including the teeth 16, and rack 1a so that the magazine travels in the direction indicated by the arrow 38. The detector switch S4 opens as soon as the movable contact 32 is engaged by the rearmost slide 2'. Since the contact electrode 24 of the thyristor 23 is connected with the base of the transistor 33, the latter continues to block the flow of current. As the magazine 1 returns to its starting position in which the foremost slide 2 is located in the plane of the slide changer 10, the median contact 20 of the switch S2 slides off the top face 1b of the rack 1a and engages the contact 36. This opens the circuit of the resetting motor 15 so that the magazine 1 is arrested in the starting position and the foremost slide 2 is ready for transfer to the projection position. The switch S2 insures that the motor 15 cannot transport the magazine 1 rearwardly beyond the starting position, i.e., to a position in which the foremost slide 2 would be located behind the plane of the slide changer 10. Eventual short-lasting rotation of the output shaft and worm 15a of the motor 15 due to inertia (subsequent to movement of the contact 20 away from the contact 19) is compensated for by the fact that the pinion which meshes with the rack 1a has only two teeth 16. It is preferred to insure that the motor 15 comes to a halt when the teeth 16 are not in mesh with the teeth of the rack 1a; thus, the teeth 16 then cannot interfere with the indexing of the magazine 1 (arrow 6) by the indexing mechanism which receives motion from the main motor 5 and clutch 4 and which preferably moves the magazine by way of the rack 1a.

When the detector switch S4 is open and the contact 20 engages the contact 36 of the switch S2, the base of the transistor 33 is positive and the transistor conducts current. The transistor 33 then energizes the electromagnet of the clutch 4 so that the clutch connects the motor 5 with the worm wheel 7. Thus, the worm wheel 7 can reciprocate the slide changer 10 so that the projection of images on the slides 2 begins anew and the motor 15 again resets the magazine 1 when the last slide 2' returns into its compartment 1A. As the slide changer 10 thereupon leaves its right-hand end position in response to energization of the electromagnet of the clutch 4, its arm 10a moves away from the contact 18 of the switch S1 so that the contact 18 automatically returns into engagement with the contact 35. The electromagnet of the clutch 4 is then connected with the positive pole of the energy source 75 by way of the switch S1.

An important advantage of the just described slide projector is that the projection of images on a series of slides can be repeated automatically and as often as desired regardless of whether the magazine is completely or partially filled with slides and without lengthy interruptions in the projection of images. Thus, the motor 15 resets the magazine 1 to its starting position as soon as the switch S4 detects the placing of the last slide 2' into the range of the slide changer 10 and as soon as the slide changer thereupon returns the last slide to the respective compartment, regardless of whether the last slide 2' is located in the rearmost compartment 1A or in any other compartment of the magazine. This insures that the length of the intervals required for resetting of the magazine 1 is invariably the same, irrespective of the number of slides in the magazine. The return movements of magazine 1 to its starting position are triggered directly by the slides which are tracked by the contact 32 of the detector switch S4. If the user desires, the magazine can contain two groups or series of slides which are separated from each other by a gap of a width which suffices to cause a closing of the detector switch S4 when the projection of images on the front group or series of slides is completed. The motor 15 thereupon automatically resets the magazine to its starting position for renewed projection of images on the front group of slides whereby the slides of the rear group merely travel back and forth but are not moved from and back into their compartments.

Figure 3:
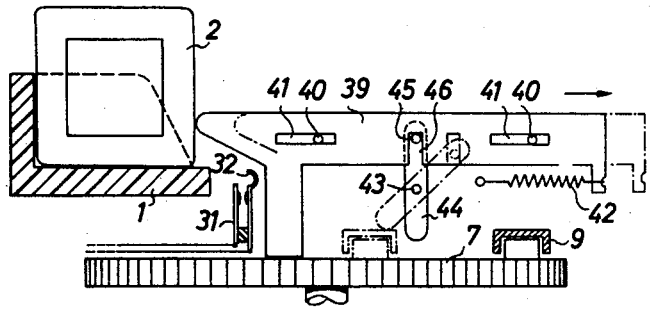
FIG. 3 is a fragmentary transverse sectional view of a slide projector which employs modified detector means having a switch actuating member which scans the slides in the magazine.

FIG. 3 illustrates modified slide detector means comprising the aforementioned contacts 31, 32 and a reciprocable switch actuating member or trip 39 which is movable in a plane disposed at right angles to the direction of movement of the magazine 1. The contact 32 is elastic and normally assumes the illustrated position in which the switch of the detector is open. The trip 39 is provided with parallel slots 41 for guide pins 40 which are mounted in the housing of the slide projector. A spring 42 urges the trip 39 toward the magazine 1 so that the tip of the trip normally engages the frame of a slide 2. The switch of the detector closes when the last slide moves beyond the plane of the trip 39 because the latter is then free to move the elastic contact 32 against the contact 31. The structure of FIG. 3 further comprises means for disengaging the trip 39 from the adjacent slide 2 during those intervals when the magazine 1 is being indexed by the mechanism receiving motion from the motor 5 and clutch 4. Such disengaging means comprises a two-armed lever 44 which is pivotable on a fixed shaft 43 and has a lower arm which extends into the path of movement of the carriage 9 for the slide changer 10. The carriage 9 pivots the lever 44 in a clockwise direction (to the phantom-line position of FIG. 3) when the slide changer 10 (not shown in FIG. 3) reaches that end position in which it is ready to withdraw a slide from the magazine 1. The upper arm of the lever 44 has a pin 45 which extends into a vertical recess or slot 46 of the trip 39 whereby the pin 45 moves the trip against the opposition of the spring 42 and disengages the tip of the trip from the adjacent slide 2 just before the magazine 1 is indexed by a step to place the next slide into the plane of the slide changer. The longitudinal direction of the slot 46 is normal to the direction of reciprocatory movement of the trip 39. As stated before, the contact 32 is caused to engage the contact 31 and to trigger the operation of the resetting motor 15 (not shown in FIG. 3) as soon as the trip 39 detects the absence of a slide in the adjacent compartment of the magazine 1.

The improved slide projector is susceptible of many additional modifications. For example, the thyristor 23 can be replaced with an amplifier transistor.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a slide projector, a combination comprising a magazine having a row of compartments for a series of slides and being movable forwardly from and rearwardly to a starting position; drive means including indexing means for indexing the magazine forwardly and slide changer means for moving the slides between successive compartments and a projection position during intervals between successive indexing movements of the magazine; resetting means operative to move the magazine rearwardly to said starting position; control means having a first condition in which said resetting means is operated to move the magazine rearwardly and a second condition in which said drive means is operative to index the magazine and to move the slides with reference to the magazine; detector means arranged to scan the slides in said magazine; first switching means for placing said control means into said first condition subsequent to detection of the absence of slides behind the last slide of said series by said detector means; and second switching means for placing said control means into said second condition in response to return of said magazine to said starting position.

2. A combination as defined in claim 1, wherein said control means comprises a thyristor.

3. A combination as defined in claim 1, wherein said drive means further comprises an electric driving element for said indexing means and said slide changer means.

4. A combination as defined in claim 3, wherein said resetting means comprises an electric motor, said control means comprising means for completing the circuit of said driving element in said second condition thereof and for completing the circuit of said motor in said first condition thereof.

5. A combination as defined in claim 4, further comprising a switching device connected between said control means and said driving element.

6. A combination as defined in claim 5, wherein said switching device comprises transistor means.

7. A combination as defined in claim 1, wherein said control means comprises a thyristor and said detector means conoperates with said first switching means to place said thyristor into said first condition subsequent to detection of the last slide of said series and upon return movement of such last slide into the respective compartment.

8. A combination as defined in claim 1, wherein said control means comprises a circuit including a voltage divider and a thyristor having a control electrode, said detector means comprising a switch arranged to connect said control electrode with said voltage divider in response to placing of the last slide of said series into the range of said slide changer means.

9. A combination as defined in claim 1, wherein said detector means comprises an electric switch having a first contact and a second contact tending to engage said first contact to thereby place said control means into said first condition, said second contact being located in the path of movement of and being disengaged by the slides of said series from said first contact during forward movement of said magazine from said starting position until the last slide of said series moves beyond said second contact.

10. A combination as defined in claim 1, wherein said detector means comprises a member adjacent to the path of movement of the slides of said series and arranged to scan such slides, and a switch which is actuated by said member to place said control means into said first condition in response to movement of the last slide of said series beyond said member during indexing of said magazine.

11. A combination as defined in claim 1, wherein said drive means further comprises an electric driving element arranged to transmit motion to said indexing means and said slide changer means, said control means having an output circuit and further comprising transistor means having emitter means connected to said driving element and a base connected to said output circuit.

12. A combination as defined in claim 11, wherein said detector means comprises a switch which is actuated in response to placing of the last slide of said series into the range of said slide changer means whereby said switch causes said transistor means to open the circuit of said driving element.

13. A combination as defined in claim 11, wherein said control means includes a thyristor having a contact electrode and further comprising switch means for connecting said contact electrode to the base of said transistor means to thereby cause said transistor means to open the circuit of said driving element.

14. A combination as defined in claim 1, wherein said first switching means comprises a two-way switch having first and second contacts and a movable third contact located in the path of movement of said slide changer means, said third contact normally engaging said first contact and being moved against said second contact in response to movement of said slide changer means to a position in which a slide is returned into the respective compartment whereby said second and third contacts place said control means into said first condition on return movement of the last slide of said series into the respective compartment.

15. A combination as defined in claim 1, wherein said second switching means comprises a limit switch.

16. A combination as defined in claim 15, wherein said limit switch comprises a first contact, a second contact and a third contact tracking said magazine and engaging said first contact, said third contact being arranged to engage said second contact in response to movement of said magazine to said starting position and to thereby place said control means into said second condition.

17. A combination as defined in claim 1, wherein said magazine includes a toothed rack and said resetting means comprises an electric motor and pinion means driven by said motor and arranged to move the magazine rearwardly by way of said rack.

18. A combination as defined in claim 17, wherein said pinion includes at least one tooth which is disengaged from said rack in the starting position of said magazine.

19. A combination as defined in claim 1, wherein said magazine is a straight tray.

* * * * *